United States Patent Office 2,973,120
Patented Feb. 28, 1961

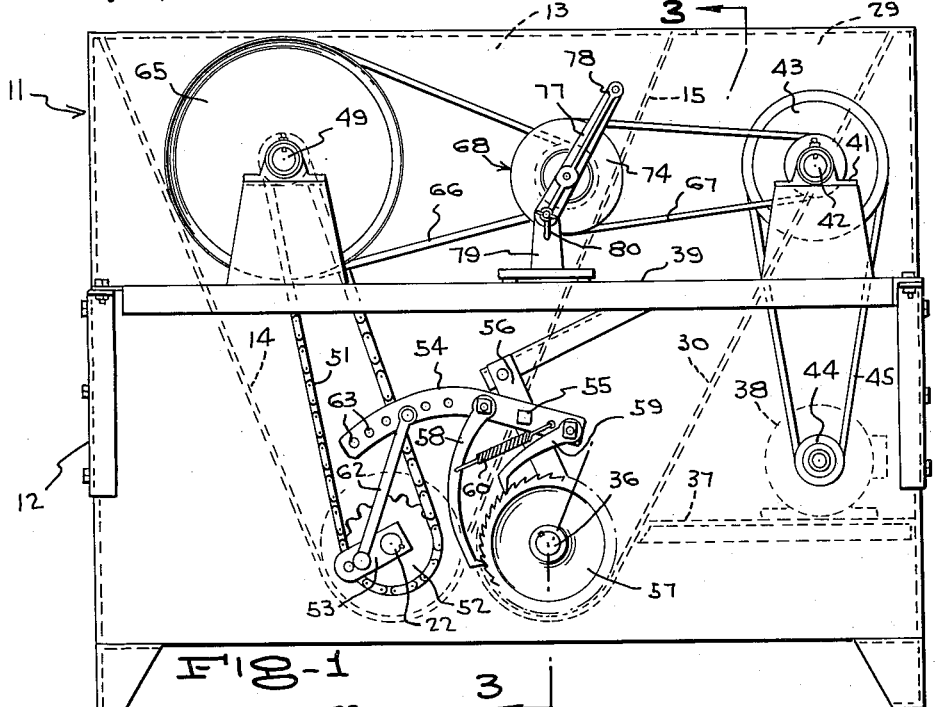
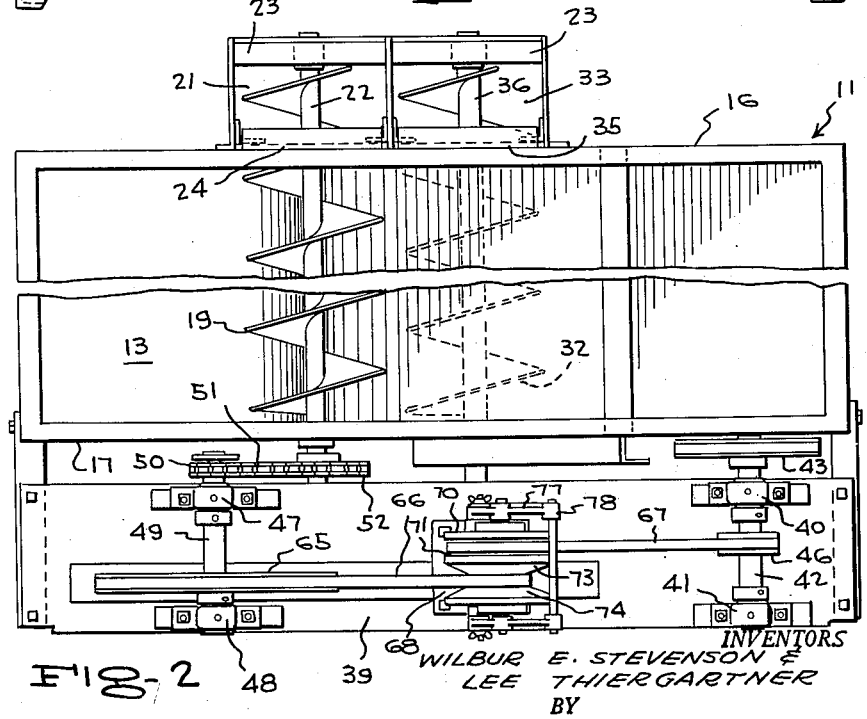

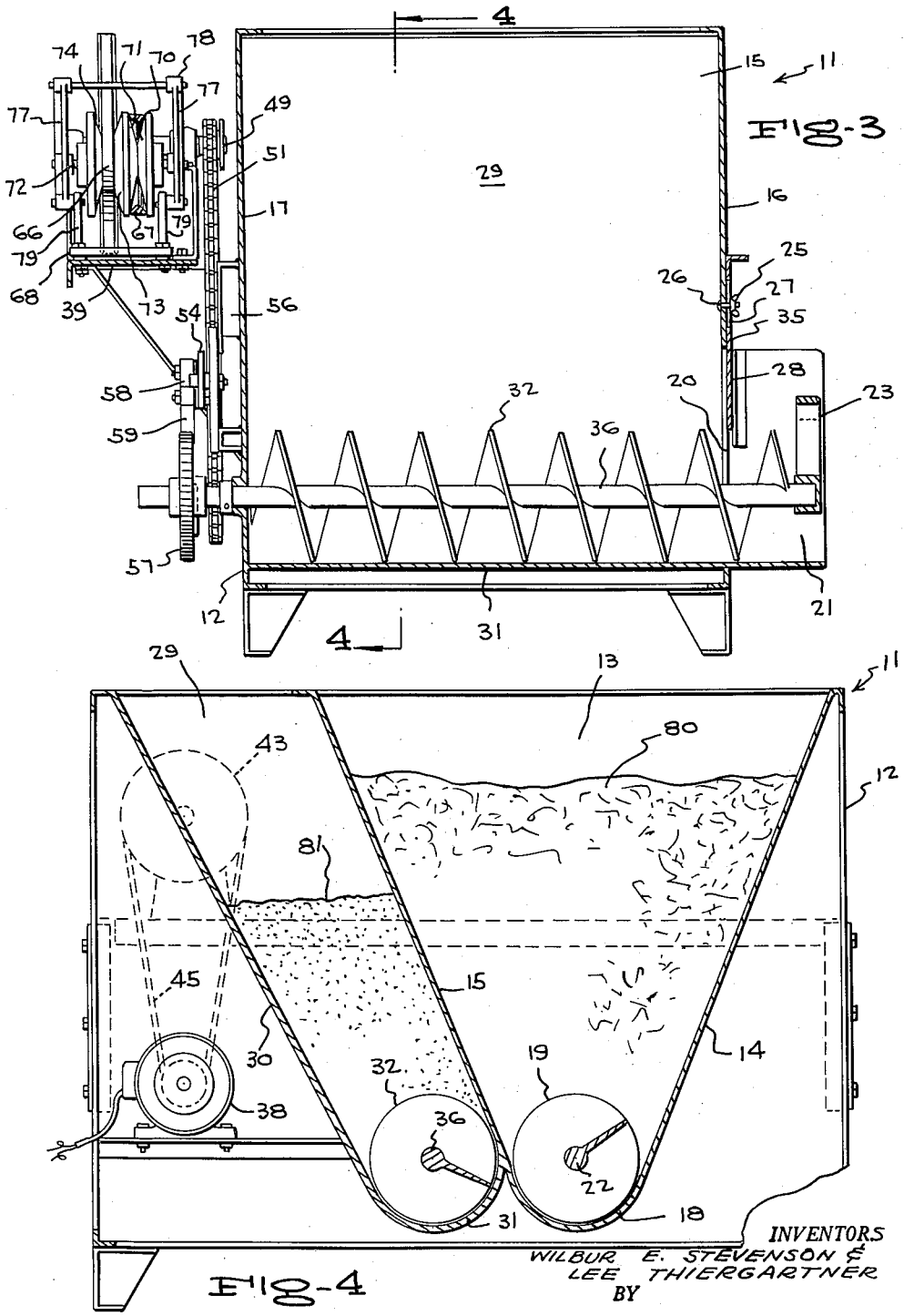

2,973,120

DISPENSER FOR ANIMAL FEED MATERIALS

Wilbur E. Stevenson, 753 N. Maple St., Rte. 1, Marysville, Ohio, and Lee Thiergartner, Rte. 1, Milford Center, Ohio Filed July 17, 1959, Ser. No. 827,868

9 Claims. (Cl. 222—134)

This invention relates to animal feeding devices, and more particularly to an apparatus for dispensing feed materials to be fed to farm animals.

The main object of the invention is to provide a novel and improved feed dispenser which is simple in construction, which is reliable in operation, and which is easy to adjust to provide a desired proportion of blended feed ingredients as well as a desired rate of supply of the blended ingredients.

A further object of the invention is to provide an improved animal feed dispensing apparatus which is relatively inexpensive to fabricate, which is durable in construction, and which is provided with means to adjust the proportions of the ingredients handled by the apparatus so as to provide a resultant mixture containing desired proportions of the respective ingredients, the apparatus being provided with means for conveniently and readily adjusting the rate of supply of the resultant feed mixture therefrom.

Further objects and advantages of the invention will become apparent from the following description and claims, and from the accompanying drawings, wherein:

Figure 1 is a side elevational view of an improved feed mixer constructed in accordance with the present invention.

Figure 2 is a fragmentary top plan view of the feed mixing apparatus shown in Figure 1.

Figure 3 is a transverse vertical cross sectional view taken substantially on the line 3—3 of Figure 1.

Figure 4 is a fragmentary vertical cross sectional view taken substantially on the line 4—4 of Figure 3.

Referring to the drawings, 11 generally designates an improved feed dispensing apparatus according to the present invention. The apparatus 11 comprises a generally rectangular supporting frame 12 on which is mounted a first supply hopper or compartment 13 which is provided with the downwardly convergent side walls 14 and 15 and vertical end walls defined by the opposing parallel vertical walls 16 and 17 forming part of the framework 12. The main supply compartment 13 is provided with the arcuately curved bottom wall 18, and journaled concentrically with said bottom wall 18 in the lower portion of the main supply compartment 13 is a first feed-conveying auger 19. The auger 19 extends through a discharge opening 20 provided in the lower portion of the tank wall 16 and extends into a first discharge trough 21 communicating with the compartment 13 through the passage 20, as is clearly shown in Figure 3. The end of the auger shaft 22 is journaled in a suitable bracket 23 rigidly mounted in the trough 21 but being spaced above the bottom of the trough to provide ample clearance for the material discharged outwardly from the trough by the auger member 19. A manually adjustable vertically slidable gate member 24 is provided on the wall 16 above the discharge trough 21, the gate member 24 being vertically adjustable so as to regulate the effective area of the opening 20, the adjustable plate member 24 being secured in adjusted position by a wing nut 25 engaged on a screw 26 extending through the wall 16 and through a vertical slot 27 provided in the upper portion of the gate member 24. The side edges of the gate member 24 are slidably engaged by opposing vertical angle bars 28 secured to the upper portions of the respective side walls of the trough 21.

Designated at 29 is a second feed supply compartment which is located adjacent the first feed supply compartment 13 and which is defined by an inclined wall 30 secured in the frame 12 and spaced from the wall 15, an arcuately curved bottom wall 31 merging with the bottom edge of wall 30 and the bottom marginal portion of wall 15, as shown in Figure 4. The end walls of the compartment 29 are defined by the vertical parallel wall members 16 and 17, as in the case of the main feed compartment 13.

Designated at 32 is a feed-conveying auger member, similar to the auger member 19, the member 32 being journaled in the lower portion of the compartment 29 concentrically with the arcuate bottom wall 31 of the compartment, as is clearly shown in Figure 4. The auger member 32 is rotatably supported in the same manner as the auger member 19 and extends into a discharge trough 33 which is located in side-by-side relationship with the discharge trough 21, and which is provided with the vertically adjustable flow-regulating gate member 35 similar to the gate member 24 previously described.

The feed supply compartment 29 is provided in its lower portion with a discharge opening 20, similar to the opening previously described for the main feed-supply compartment 13, the discharge opening 20 of the compartment 29 providing communication between the trough 21 and the interior of said compartment, and the rate of flow of material therethrough being regulated by suitably adjusting the vertically adjustable gate member 35. The gate member 35 is provided with a slot 27 through which extends a bolt 26 mounted in the wall 16 and provided on its outer end with a wing nut 25, as in the case of the vertically adjustable gate member 24.

The end of the shaft 36 of the auger member 32 is journaled in a bracket 23 mounted in the trough 33 and being identical with the bracket employed to rotatably support the shaft 22 of auger 19 in trough 21.

The frame 12 includes a horizontal supporting plate 37 located subjacent the inclined wall 30. Mounted on the supporting plate 37 is an electric motor 38.

Secured to the frame 12 forwardly adjacent the vertical wall element 17 thereof and located at the upper portion of the apparatus is a horizontal supporting plate 39. Journaled on transversely aligned bearing brackets 40 and 41 mounted on the supporting plate 39 is a shaft 42 provided at one end thereof with a large pulley 43 which is coupled to the output pulley 44 of the shaft of motor 38 by a belt 45. A pulley 46 is secured on the intermediate portion of the transverse shaft 42. Mounted on the supporting plate 39 are the transversely aligned bearing brackets 47 and 48 in which is journaled the transverse shaft 49. Secured on the end of shaft 49 adjacent the vertical wall element 17 of frame 12 is a sprocket wheel 50 which is coupled by a sprocket chain 51 to a sprocket wheel 52 secured on the end of the auger shaft 22. Secured to the end of the auger shaft 22 adjacent the sprocket wheel 52 is a crank arm 53. Designated at 54 is a lever member which is pivoted at 55 to a stationary bracket member 56 forming part of the frame 12 and located adjacent the wall 17 above the auger shaft 36. Secured on the end of the auger shaft 36 is a ratchet wheel 57 located subjacent the lever 54. Respective pawl members 58 and 59 are pivoted to the lever 54 on opposite sides of the pivotal connection 55 of said lever, the pawl members 58 and 59 drivingly engaging the teeth of the ratchet wheel 57 and being arranged to rotate the ratchet wheel 57 in counterclockwise steps, as viewed in Figure 1, responsive to successive rocking movements of the lever 54.

As shown in Figure 1, the rear pawl member 59 engages the teeth of the ratchet wheel 57 by gravity, whereas a coiled spring 60 connects the intermediate portion of the pawl member 58 to the rear end portion of the lever 54 to bias the pawl member 58 into engagement with the toothed periphery of the ratchet wheel 57.

As will be apparent from Figure 1, counterclockwise rotation of the lever 54 causes the pivoted pawl element 58 to drive the ratchet wheel 57 through one step of counterclockwise rotation. Clockwise rotation of the lever 54, as viewed in Figure 1, causes the pivoted pawl member 59 to rotate the ratchet wheel 57 through a second step of counterclockwise rotation. Thus, the ratchet wheel 57 is rotated in intermittent steps in a counterclockwise direction, as viewed in Figure 1, responsive to successive oscillation of the lever 54.

Designated at 62 is a link rod which is pivotally connected at its lower end to the arm 53 and which is pivotally connected at its upper end to a selected one of a series of spaced connection apertures 63 formed in the lever 54 forwardly of the pivoted pawl member 58. Thus, rotation of the crank arm 53 causes the lever 54 to oscillate at a frequency determined by the speed of rotation of the crank arm 53 and at an amplitude determined by the selected aperture 63 to which the upper end of the link arm 62 is connected.

As will be readily apparent, the amplitude of oscillation of the lever 54 determines the magnitude of the angular steps of rotation of the ratchet wheel 57 produced by the driving engagement of the respective pawl elements 58, 59 with said ratchet wheel.

Mounted on the transverse shaft 49 is a relatively large pulley 65 on which is engaged a belt 66. A belt 67 is engaged on the pulley 46 provided on the transverse shaft 42. Belt 67 is drivingly coupled to belt 66 through a conventional variable-speed coupling assembly 68 mounted on the supporting plate 39 between the shafts 42 and 49. The coupling assembly 68 is of a conventional type and includes the opposing pairs of coupling cone elements 70, 71 slidably mounted on a supporting shaft 72 and which receives the belt 67 therebetween in driving cooperation therewith. The intermediate cone element is integrally formed with an opposing cone element 73 which faces a cooperating cone element 74 slidably mounted on the shaft 72, the belt 66 being received in driving engagement between the cone elements 73 and 74. The cone-supporting shaft 72 is journaled to the intermediate portions of the arms 77, 77 of a yoke member 78, the bottom ends of the arms 77 being adjustably connected to upstanding supporting lugs 79, 79. The lugs 79 are provided with vertical slots 80 at which the lower ends of the arms 77 are connected, said lower ends being rotatably adjustable and vertically adjustable in the slots 80, whereby to vary the location of supporting shaft 72 of the variable-speed coupling assembly. Since the belt 67 is received between the cone elements 70 and 71 and the belt 66 is received between the cone elements 73 and 74, the adjustment of the position of the cone shaft 72 caused by adjustment of the yoke member 78 causes an adjustment of the speed ratio between the drive belt 67 and the driven belt 66, due to the shifting of the cone elements engaged by the belts as the cone-supporting shaft 72 is adjusted in position. Thus, the speed ratio between the driving shaft 42 and the driven shaft 49 may be adjusted by adjusting the variable-speed coupling assembly 68 in a manner above described.

In using the apparatus, a first feed ingredient 80 is disposed in the main supply compartment 13 and a second feed ingredient 81 is disposed in the supply compartment 29. By adjusting the variable-speed coupling assembly 68, the rate of rotation of the first supply auger member 19 may be suitably adjusted to provide a desired rate of supply of the ingredients 80 to the discharge trough 21 associated with the compartment 13.

Lever 54 oscillates simultaneously with the rotation of the supply auger 19, causing the supply auger 32 to be rotated in steps whose magnitude depends upon the position of adjustment of the upper pivotal connection of link bar 62, namely, the selected aperture 63 of lever 54 to which the upper end of the link bar 62 is connected. The frequency of the steps of the rotation of the auger 32 is in accordance with the rate of rotation of the main supply auger 19, whereas the amplitude of said steps of rotation depends upon the amplitude of the oscillation of the lever 54, which in turn is determined by the point at which the upper end of link bar 62 is connected to said lever. Therefore, as the main supply auger 19 continuously rotates, the auxiliary supply auger 32 rotates in steps of selected magnitude, providing a selected rate of discharge of the ingredient 81 into the discharge trough 33 associated with the compartment 29. The material may be discharged from the troughs 21 and 33 into a suitable receiving container in which the ingredients 80 and 81 are thus blended in a desired proportion.

As above mentioned, the rate of discharge of the material from the respective compartments 13 and 29 may be regulated by adjusting their associated gate members 24 and 35.

The rate of discharge of the apparatus may be adjusted by suitably setting the variable-speed coupling assembly 68 in the manner above described. The proportion of the ingredients may be established by suitably adjusting the connection of the link arm 62 to the lever member 54. Final adjustment of the physical rate of discharge of the material from the compartments 13 and 29 may be obtained by suitably adjusting the vertically movable gate members 24 and 35.

While a specific embodiment of an improved seed mixer has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a feed dispenser, a pair of supply compartments adapted to contain feed ingredients to be mixed, means defining respective discharge troughs communicating with the bottom portions of said compartments, said troughs being in side-by-side relationship, respective feed-conveying augers journaled horizontally in the bottom portions of said compartments in parallel relationship and extending into said discharge troughs, a drive motor, means drivingly coupling said motor to one of said feed-conveying augers to rotate said one of the augers continuously responsive to continuous operation of the motor, and means drivingly coupling the other feed-conveying auger to said one of the augers to rotate said other auger in intermittent steps responsive to the continuous rotation of said one of the augers.

2. In a feed dispenser, a support, a pair of supply compartments mounted on said support and being adapted to contain feed ingredients to be mixed, means defining respective discharge troughs communicating with the bottom portions of said compartments, said troughs being in side-by-side relationship, respective feed-conveying augers journaled horizontally in the bottom portions of said compartments in parallel relationship and extending into said discharge troughs, a drive motor, means drivingly coupling said motor to one of said feed-conveying augers to rotate said one of the augers continuously responsive to continuous operation of the motor, a lever pivoted to said support, a crank arm connected to said one of the augers, link means connecting said crank arm to said lever, whereby to oscillate the lever responsive to said continuous rotation of said one of the augers, a ratchet disc secured to the other auger, and pawl means pivoted to said lever and engaging the periphery of said ratchet disc, said pawl means being constructed and arranged to periodically drivingly engage the periphery of said ratchet disc responsive to oscillation of said lever, whereby to rotate said other auger in intermittent steps responsive to the continuous rotation of said one of the augers.

3. In a feed dispenser, a support, a pair of supply compartments mounted on said support and being adapted to contain feed ingredients to be mixed, means defining respective discharge troughs communicating with the bottom portions of said compartments, said troughs being in side-by-side relationship, respective feed-containing augers journaled horizontally in the bottom portions of said compartments in parallel relationship and extending into said discharge troughs, a drive motor, a variable-speed coupling assembly mounted on said support, means drivingly coupling said motor to said one of the feed-conveying augers through said variable-speed coupling assembly to rotate said one of the augers continuously at a selected speed responsive to continuous operation of the motor, a lever pivoted to said support, a crank arm connected to said one of the augers, link means connecting said crank arm to said lever, whereby to oscillate the lever responsive to said continuous rotation of said one of the augers, a ratchet secured to the other auger, and pawl means pivoted to said lever and engaging the periphery of said ratchet disc, said pawl means being constructed and arranged to periodically drivingly engage the periphery of said ratchet disc responsive to oscillation of said lever, whereby to rotate said other auger in intermittent steps responsive to the continuous rotation of said one of the augers.

4. In a feed dispenser, a pair of supply compartments adapted to contain feed ingredients to be mixed, a pair of side-by-side discharge troughs communicating with the bottom portions of said compartments, said bottom portions having arcuately curved side-by-side bottom walls, respective parallel feed-conveying augers journaled in said bottom portions coaxially with said bottom walls and extending into said discharge troughs, a drive motor, means drivingly coupling said motor to one of said feed-conveying augers to rotate said one of the augers continuously responsive to continuous operation of the motor, and means drivingly coupling the other feed-conveying auger to said one of the augers to rotate said other auger in intermittent steps responsive to the continuous rotation of said one of the augers.

5. In a feed dispenser, a pair of supply compartments having common parallel vertical front and rear walls, downwardly and inwardly inclined side walls, and parallel arcuately curved side-by-side bottom walls, side-by-side discharge troughs at said common rear wall communicating with said bottom walls through the rear wall, parallel feed-conveying augers journaled in the bottom portions of said supply compartments coaxially with said bottom walls and extending into said discharge troughs, a drive motor, means drivingly coupling said motor to one of said feed-conveying augers to rotate said one of the augers continuously responsive to continuous operation of the motor, and means drivingly coupling the other feed-conveying auger to said one of the augers to rotate said other auger in intermittent steps responsive to the continuous rotation of said one of the augers.

6. In a feed dispenser, a pair of supply compartments adapted to contain feed ingredients to be mixed, said supply compartments having common parallel vertical front and rear walls, downwardly and inwardly inclined side walls and parallel arcuately curved side-by-side bottom walls, side-by-side discharge troughs at said common rear wall communicating with said bottom walls through the rear wall, parallel feed-conveying augers journaled in the bottom portions of said supply compartments coaxially with said bottom walls and extending into said discharge troughs, respective vertically adjustable vertical gate members mounted on said rear wall over said discharge troughs, a drive motor, means drivingly coupling said motor to one of said feed-conveying augers to rotate said one of the augers continuously responsive to continuous operation of the motor, and means drivingly coupling the other feed-conveying auger to said one of the augers to rotate said other auger in intermittent steps responsive to the continuous rotation of said one of the augers.

7. In a feed dispenser, a support, a pair of supply compartments mounted on said support and having common parallel vertical front and rear walls, downwardly and inwardly inclined side walls, and parallel arcuately curved side-by-side bottom walls, side-by-side discharge troughs at said common rear wall communicating with said bottom wall through the rear wall, parallel feed-conveying augers journaled in the bottom portions of said supply compartments coaxially with said bottom walls and extending into said discharge troughs, a drive motor, means drivingly coupling said motor to one of said feed-conveying augers to rotate said one of the augers continuously responsive to continuous operation of the motor, a lever pivoted to said support, a crank arm connected to said one of the augers, link means connecting said crank arm to said lever, whereby to oscillate the lever responsive to said continuous rotation of said one of the augers, a ratchet disc secured to the other auger, and pawl means pivoted to said lever and engaging the periphery of said ratchet disc, said pawl means being constructed and arranged to periodically drivingly engage the periphery of said ratchet disc responsive to oscillation of said lever, whereby to rotate said other auger in intermittent steps responsive to the continuous rotation of said one of the augers.

8. In a feed dispenser, a support, a pair of supply compartments mounted on said support and having common parallel vertical front and rear walls, downwardly and inwardly inclined side walls, and parallel, arcuately curved side-by-side bottom walls, side-by-side discharge troughs at said common rear wall communicating with said bottom wall through the rear wall, parallel feed-conveying augers journaled in the bottom portions of said supply compartments coaxially with said bottom walls and extending into said discharge troughs, respective vertically adjustable vertical gate members mounted on said rear wall over said discharge troughs, a drive motor, means drivingly coupling said motor to one of said feed-conveying augers to rotate said one of the augers continuously responsive to continuous operation of the motor, a lever pivoted to said support, a crank arm connected to said one of the augers, link means connecting said crank arm to said lever, whereby to oscillate the lever responsive to said continuous rotation of said one of the augers, a ratchet disc secured to the other auger, and pawl means pivoted to said lever and engaging the periphery of said ratchet disc, said pawl means being constructed and arranged to periodically drivingly engage the periphery of said ratchet disc responsive to oscillation of said lever, whereby to rotate said other auger in intermittent steps responsive to the continuous rotation of said one of the augers.

9. In a feed dispenser, a support, a pair of supply compartments mounted on said support and having common parallel vertical front and rear walls, downwardly and inwardly inclined side walls, and parallel arcuately curved side-by-side bottom walls, side-by-side discharge troughs at said common rear wall communicating with said bottom wall through the rear wall, parallel feed-conveying augers journaled in the bottom portions of said supply compartments coaxially with said bottom walls and extending into said discharge troughs, respective vertically adjustable vertical gate members mounted on said rear wall over said discharge troughs, a drive motor, a variable-speed coupling assembly mounted on said support, means drivingly coupling said motor to one of said feed-conveying augers through said variable-speed coupling assembly to rotate said one of the augers continuously at a selected speed responsive to continuous operation of the motor, a lever pivoted to said support, a crank arm connected to said one of the augers, link means connecting said crank arm to said lever, whereby to oscillate the lever responsive to said continuous rotation of said one of the augers, a ratchet disc secured to other auger, and pawl means pivoted to said lever and engaging the periphery of said ratchet disc, said pawl means being constructed and arranged to periodically drivingly engage the periphery of said ratchet disc responsive to oscillation of said lever, whereby to rotate said other auger in intermittent steps responsive to the continuous rotation of said one of the augers.

References Cited in the file of this patent
UNITED STATES PATENTS 2,684,785    Waldorf et al. _____ July 27, 1954